B. RICE.
Thrashing Machine.
No. 31,675.
Patented March 12, 1861.
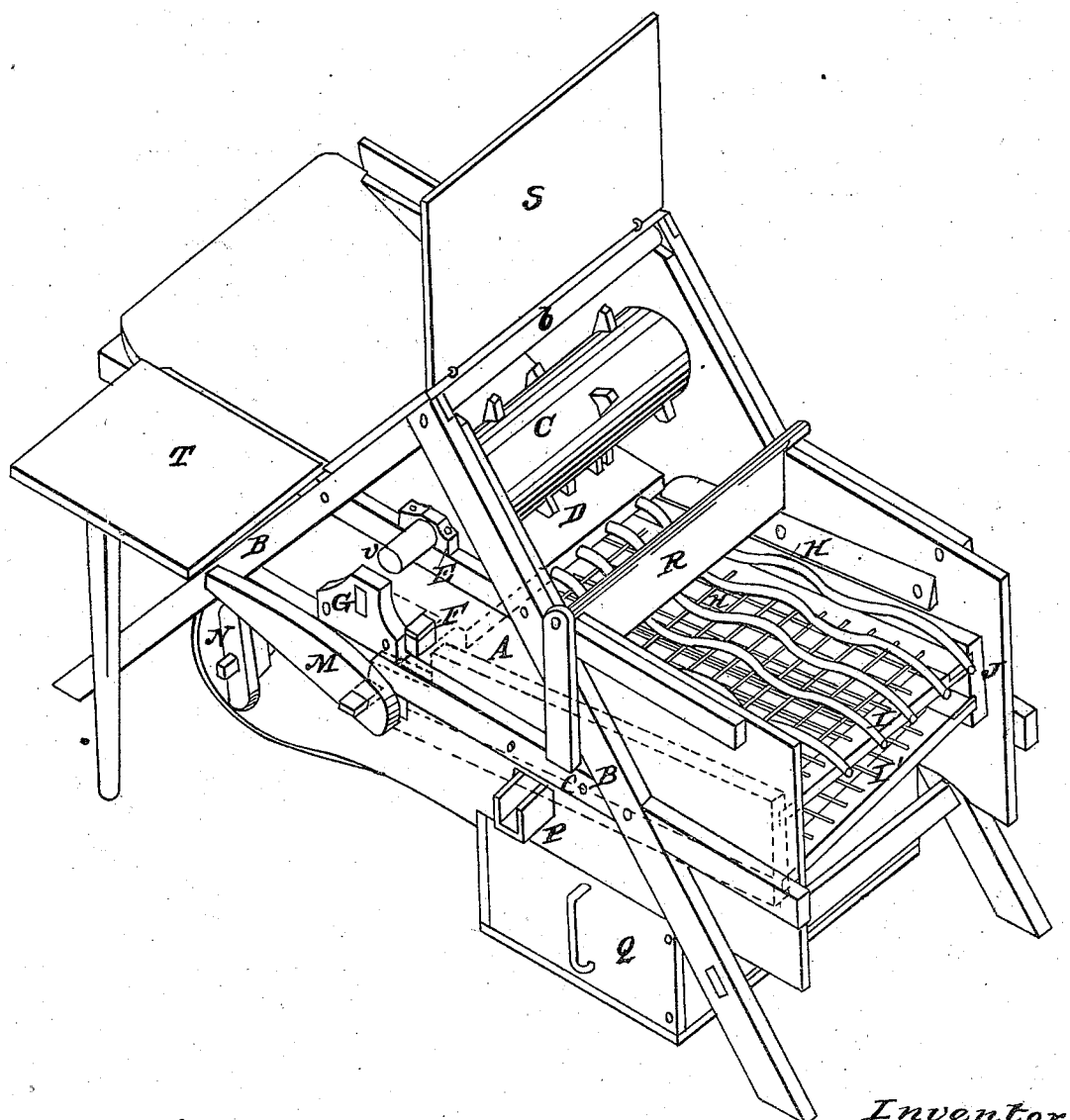
Witnesses:
Inventor:

UNITED STATES PATENT OFFICE.

BYRON RICE, OF SCHUYLER, NEW YORK.

GRAIN-SEPARATOR.

Specification of Letters Patent No. 31,675, dated March 12, 1861.

*To all whom it may concern:*

Be it known that I, BYRON RICE, of Schuyler, in the county of Herkimer and State of New York, have invented an Improvement in Grain-Separators; and I do hereby declare that the following is a full, clear, and exact description of the same, reference being had to the accompanying drawing, making part of this specification and being a perspective view of my invention.

My invention consists in the combination and arrangement of parts of a separating machine as hereinafter more fully described.

To enable others skilled in the art to make and use my invention I will proceed to describe its construction and operation.

A, represents the framing of the machine supported upon legs B, B, which are attached to the sides thereof in the form of rafters and strengthened and prevented from spreading apart at top by a cross bar $b$.

C, represents a toothed cylinder located in the machine immediately over a toothed concave D, and journaled in boxes E, attached to the sides of the machine.

F F, are projecting arms on each side of the concave near the back, which pass through slots in the sides of the framing and by means of wedges on two sides thereof serve to adjust the concave relatively to the toothed cylinder. The forward end of the concave is supported upon a cross bar G.

H, H, are crooked prongs composed of round iron secured in the rear end of the concave D, and extending over the shoe, the object of which is to agitate the straw as it passes out at the rear end of the machine and thus effectually shake out any grain left therein after being subjected to the action of the beaters.

I I′, are screens or sieves fitted to slide in grooves in the shoe J, which is mounted and poised upon a transverse shaft $c$, upon which it receives a vibratory or rocking motion through levers M, and cams N, on the fan shaft O.

I, represents a coarse sieve fixed in the shoe parallel with the axis of the same. I′, represents a fine sieve fixed obliquely in the frame, one side of the said shoe being deeper than the other for that purpose. The object of this obliquity of the lower screen is to cause the grain after being thoroughly cleaned to pass out through the spout P, at the side of the machine.

Q, is a chess box located beneath the sieves.

R, is a guard to prevent the grain from being thrown beyond the sieves by the action of the threshing cylinder. The said guard is pivoted in the framing so that it can be turned up out of the way when desired. The upper part of the legs are covered and form a casing for the toothed cylinder.

S, is a door hinged at the top of the same and forms the back part of the casing.

T, is a table attached to one side of the machine near the front end for the purpose of holding grain for the feeder.

$V_1$, is the main driving pulley secured upon one end of the cylinder shaft, the opposite end of which is provided with a pulley of larger diameter over which a belt runs and communicates motion to the fan shaft and attachments. The belt and pulleys are not shown in the drawing.

The operation is, as follows:—Motion being imparted to the machine the grain is fed from the table in between the toothed cylinder and concave, which thoroughly separates the grain, chess and chaff, from the straw, the straw then passes from the concave on to the crooked prongs and is forced over them and out at the rear end of the machine by the action of the blast created by the fan. The grain falls through the upper sieve on to the lower sieve or screen through which the chess passes into the box below, while the lighter particles such as chaff, and other refuse matters, are blown out at the rear end of the machine. The clean grain after being thoroughly cleaned passes out at the side of the machine through the spout.

What I claim as my invention herein and desire to secure by Letters Patent, is,—

1. The arrangement of the sieves I, I′, concave D, provided with arms F, cams N, and lever M, in the manner and for the purposes set forth.

2. The combination and arrangement of adjustable concave D, crooked prongs H, H, and guard R, operating in connection with the shaking shoe J, in the manner, and for the purpose set forth.

BYRON RICE.

Witnesses:
 BURREL RICE,
 AMASU MANN.